United States Patent [19]
Seibert et al.

[11] Patent Number: 4,803,840
[45] Date of Patent: Feb. 14, 1989

[54] HYDRAULIC BRAKE SYSTEM FOR AUTOMOTIVE VEHICLES

[75] Inventors: Wolfram Seibert, Pfungstadt; Norbert Ocvirk; Guenter Trach, both of Offenbach; Otto Determann, Darmstadt; Horst P. Becker, Frankfurt am Main, all of Fed. Rep. of Germany

[73] Assignee: Alfred Teves GmbH, Frankfurt am Main, Fed. Rep. of Germany

[21] Appl. No.: 6,685

[22] Filed: Jan. 23, 1987

[30] Foreign Application Priority Data

Jan. 23, 1986 [DE] Fed. Rep. of Germany ....... 3601914

[51] Int. Cl.$^4$ .............................................. F15B 7/00
[52] U.S. Cl. ......................................... 60/545; 60/591
[58] Field of Search .................................. 60/545, 591

[56] References Cited

U.S. PATENT DOCUMENTS

| | | | |
|---|---|---|---|
| 4,143,514 | 3/1979 | Leiber | 60/591 |
| 4,404,803 | 9/1983 | Steffes | 60/591 |
| 4,483,144 | 11/1984 | Steffes | 60/591 |
| 4,530,209 | 7/1985 | Steffes | 60/591 |
| 4,578,951 | 4/1986 | Belart | 60/591 |
| 4,641,894 | 2/1987 | Belart | 60/591 |
| 4,681,375 | 7/1987 | Belart | 60/545 |

FOREIGN PATENT DOCUMENTS 2086508 5/1982 United Kingdom .

Primary Examiner—Edward K. Look
Attorney, Agent, or Firm—James B. Raden

[57] ABSTRACT

A hydraulic brake system is described including a tandem master cylinder whose working chambers are connected by separate brake lines to pressure control valves of a brake slip control apparatus, having the wheel brakes connected downstream of the control valves. A pump unit including a pump communicates with the brake lines through pressure lines and non-return valves. Upon activation of the brake slip control apparatus, the drive of the pump is activated whereupon the pump feeds pressure fluid by way of the non-return valves into the brake line and the working chamber of the master cylinder. The fluid is under a pressure which is in excess of the maximum braking pressure attainable by actuation of the tandem master cylinder. For the purpose of pressure control, the tandem master cylinder includes central valves designed as control valves, by virtue of which the pressure in the working chambers is kept at the pressure level predetermined by an actuating force at the brake pedal.

1 Claim, 1 Drawing Sheet

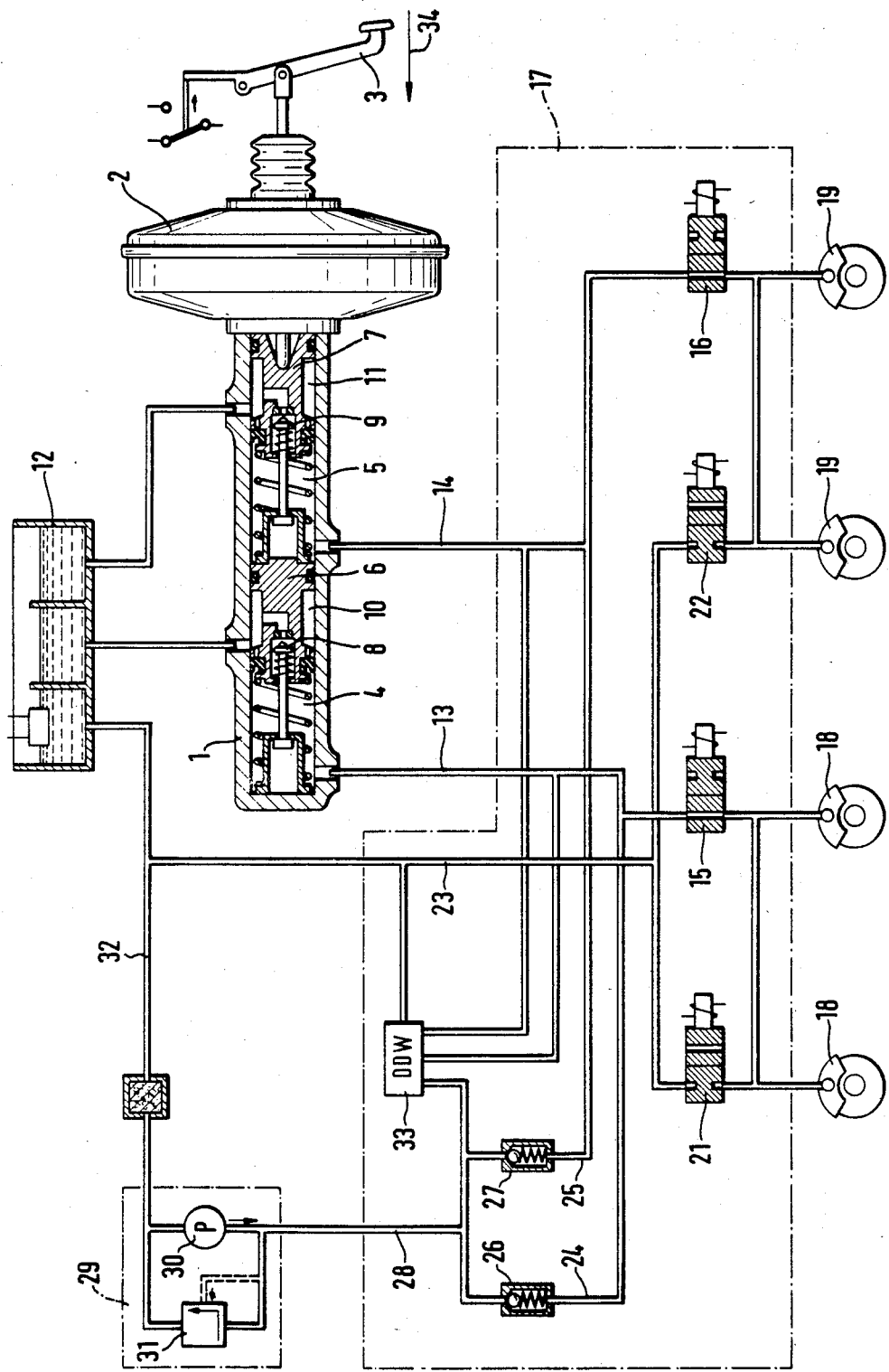

HYDRAULIC BRAKE SYSTEM FOR AUTOMOTIVE VEHICLES

BACKGROUND OF THE INVENTION

The present invention relates to a hydraulic brake system for automotive vehicles of the type including a brake master cylinder connected to an unpressurized reservoir and a brake line communicating with a working chamber of the brake master cylinder and leading to pressure control valves of a brake slip control apparatus, with at least one wheel brake connected downstream of the pressure control valves.

Brake systems of this type require during operation of the brake slip control apparatus for the repeated release and actuation of the wheel brake a quantity of pressure fluid which greatly exceeds the feed capacity of the brake master cylinder. Therefore, in these systems it is necessary during operation of the brake slip control apparatus that the wheel brake be supplied with pressure fluid out of an additional pressure fluid source, for example an energy supply system which in independent of the brake master cylinder. Further, in such systems there is the requirement in the event of failure of either the brake slip control apparatus or the energy supply system during operation of the brake slip control apparatus, the brake master cylinder be maintained in an actuating position to ensure continued actuation of the wheel brake until the vehicle is stopped.

A brake system of this type is disclosed in the German patent application No. P 34 39 258.0, wherein there is a brake power booster fed by a hydraulic energy supply system for the purpose of actuating the brake master cylinder. In this brake system, the brake line is connectible to the booster chamber of the brake power booster by way of an electromagnetically actuatable control valve of the brake slip control apparatus and a non-return valve connected down-stream thereof. This arrangement supplies the wheel brake cylinders with pressure fluid from the energy supply system of the brake power booster on operation of the brake slip control apparatus. Furthermore, this system includes a controllable non-return valve between the brake master cylinder and the control valve which non-return valve is caused by the pressure metered through the control valve to switch to its closed position providing for only return flow of pressure fluid to the brake master cylinder. As a result the brake master cylinder is kept in an alert position during operation of the brake slip control apparatus. This structure for keeping the master cylinder in an alert position is however restricted to brake systems which include a hydraulic brake power booster. Such brake systems are comparatively complicated and expensive and are not particularly applicable for use on smaller-sized vehicles. Another disadvantage of this type of brake system lies in that proper functioning of the hydraulic brake power booster and of the brake slip control apparatus depend on each other.

SUMMARY OF THE INVENTION

Therefore, it is the object of the present invention to provide for a hydraulic brake system wherein the energy supply of the brake slip control apparatus is independent of the actuating system of the brake master cylinder.

This object is achieved according to the invention wherein the working chamber of the brake master cylinder is connectible to a pressure fluid source on activation of the brake slip control apparatus, and which pressure fluid has an output pressure in excess of the maximum braking pressure that is attainable by actuation of the brake master cylinder. Also, according to the invention the master cylinder valve for isolating the working chamber and reservoir is designed as a control valve.

Accordingly, a hydraulic brake system for an automotive vehicle is provided for wherein actuation of the brake master cylinder is possible both with and without brake force boosting and wherein the wheel brake or wheel brakes are controllable by a brake slip control apparatus, with the quantity of pressure fluid required for brake slip control being supplied by an additional pressure fluid source which is connectible to the brake master cylinder.

According to another advantageous feature, on operation of the brake slip control apparatus, the brake master cylinder is kept in an alert position in which the pressure fluid supplied by the additional pressure fluid source into the working chamber displaces the master cylinder piston in the direction of brake release until the master cylinder valve opens and permits excess pressure fluid to discharge to the reservoir. Accordingly, the alert position of the brake master cylinder corresponds to the actuating position just before the closing of the master cylinder valve. The invention provides, during an emergency actuation due to failure of the brake slip control apparatus or of the additional pressure fluid source, for the availability of the entire actuating volume of the brake master cylinder.

According to a preferred embodiment of the invention, the pressure fluid source includes a pump having drive means controllable by the brake slip control apparatus. An advantage of such an arrangement being that no special control valves are required for connection of the pressure fluid source and that the additional pressure energy is generated only during operation of the brake slip control apparatus. Due to the short duration of operation, the pump and the pump drive can be designed at very low cost.

According to a further advantageous feature, the brake system is maintained closed relative to the pump outlet when the pump drive is off by a non-return valve interposed between the pump outlet and the working chamber of the brake master cylinder.

The invention is also applicable to a tandem type brake master cylinder in that the two working chambers of such a master cylinder are connectible separately to the pressure fluid source.

Another feature of the inventive brake system provides for a differential pressure alarm switch which monitors the pressure in the master cylinder working chamber and at the outlet of the pressure fluid source and which disconnects the brake slip control apparatus when a predetermined pressure difference is exceeded. Accordingly, depletion of fluid from the master cylinder is avoided during brake slip control action should the pressure fluid source fail.

Actuation of the brake master cylinder can be achieved by a brake power booster, preferably a vacuum brake power booster. Preferably a hydraulic brake power booster is driven independently of the pressure fluid source and therefore remains effective on failure of the pressure fluid source.

DETAILED DESCRIPTION OF THE PREFERRED EMBODIMENT

Shown in the drawing is a braking pressure generator including a tandem brake master cylinder 1 and a vacuum booster 2 actuatable by a brake pedal 3.

The tandem master cylinder 1 shown in cross-section includes two isolated working chambers 4, 5 which can be decreased in volume by an actuating stroke of the master cylinder pistons 6, 7. The working chambers 4, 5 are connectible to supply chambers 10, 11 through central valves 8, 9 which are open in the initial position illustrated. The supply chambers 10, 11 communicate with an unpressurized supply reservoir 12.

Extending from each working chamber 4, 5 of the tandem master cylinder 1, are brake lines 13, 14 which lead to solenoid valves 15, 16, which are open when de-energized, of a brake slip control apparatus. The valves are arranged in a valve block 17. Connected to the solenoid valves 15, 16 are two wheel brakes 18, 19 respectively, one of the wheel brakes 18 and 19, respectively, being allocated to a front wheel of a vehicle, while the other one of the wheel brakes 18 and 19, respectively, is allocated to a rear wheel of the vehicle that is diagonal to the front wheel. Hence, a dual-circuit brake system with diagonal circuit split-up is provided for.

Further, the wheel brakes 18 and 19 are connected to two solenoid valves 21, 22 of the valve block 17 which are closed when de-energized and whose inlet side communicates by way of a return line 23 with the supply reservoir 12.

A pressure line 24, 25 branches off from each brake line 13, 14. Each pressure line 24, 25 leads to a separate non-return valve 26, 27 which is closed in the initial position and which is likewise accommodated in the valve block 17. The non-return valves 26, 27 are arranged such as to open only towards the pressure lines 24, 25. A pressure line 28 leads from the non-return valves 26, 27 to the outlet of a pump unit 29 which includes an electromotively driven pump 30 and a pressure-relief valve 31 and whose inlet communicates by a line 32 with the supply reservoir 12.

The pressure in the brake lines 13, 14 and in the pressure line 28 is monitored by a differential pressure alarm switch 33 which is likewise incorporated in the valve block 17.

The brake system described operates as follows:

To initiate a brake operation, the brake pedal 3 is applied in the direction of the arrow 34, and the vacuum brake power booster 2 is driven. As a result, the vacuum brake power booster 2 moves the two master cylinder pistons 6, 7 into the tandem master cylinder 1, whereby first the central valves 8, 9 are closed and the working chambers 4, 5 are isolated from the supply chambers 10, 11. Continued displacement of the master cylinder pistons 6, 7 subsequently causes a pressure to develop in the working chambers 4, 5 which propagates via the brake lines 13, 14 and the open solenoid valves 15, 16 to the wheel brakes 18 and 19 and actuates the brake corresponding to the actuating force exerted on the brake pedal 3. The pump unit 29 is not switched on in this phase of brake actuation so that no pressure builds up in the pressure line 28. The non-return valves 26, 27 are closed and additionally are kept in their closed position by the pressure in the pressure lines 24, 25 connected to the brake lines 13, 14.

When an imminent locked condition of a vehicle wheel is recognized by the brake slip control apparatus during a braking operation, the pump unit 29 will be switched on and the pump 30 will be driven with full capacity. As a result, pressure develops in the pressure line 28 which is in excess of the actuating pressure in the brake lines 13, 14 and, respectively, in the pressure lines 24, 25 so that the non-return valves 26, 27 will open and the quantity of pressure fluid delivered by the pump 30 is introduced through the pressure lines 24, 25 into the brake lines 13, 14. The pressure fluid is also introduced into the master cylinder working chambers. With the actuating force at the brake pedal 3 remaining the same, the pistons 6, 7 are moved back in the direction of brake release under the influence of the greater pressure in the working chambers until the central valves 8, 9 open and decrease the pressure rise in the working chambers 4, 5 so as to re-attain the actuating pressure as predefined by the actuating force at the brake pedal 3. Thus, the central valves 8, 9 of the brake master cylinder 1 together with the master cylinder pistons 6, 7 perform the control function which is required in order to keep the pressure in the brake lines 13, 14 at that level that is predetermined by the actuating force exerted on the brake pedal 3. Therefore, there is no need for any special pressure control at the pump unit 29.

Simultaneously with the activation of the pump unit 29, the brake slip control apparatus drives the solenoid valves 15, 16 and 21, 22 corresponding to the predetermined control characteristics to prevent locking of the vehicle wheels by periodically increasing and decreasing the pressure in the wheel brakes 18, 19. The volume of pressure fluid required for these control actions is taken from the pump flow, while the master cylinder pistons 6, 7 are retained in the retracted control position.

The differential pressure alarm switch 33 functions to detect leakage in the brake lines 13, 14 or failure of the pump pressure in the pressure line 28 and to disconnect the brake slip control apparatus if need be. In such an event the intact part of the brake system can continue to operate by means of the brake master cylinder 1 and the brake power booster 2, and the vehicle can continue to br braked to a stop.

What is claimed is:

1. A hydraulic brake system for an automotive vehicle comprising a brake master cylinder including a working chamber connected to an unpressurized reservoir by way of a master cylinder valve for isolating said working chamber and reservoir, said working chamber connected to pressure control valves of a brake slip control apparatus, at least one wheel brake connected downstream of said control valves, said working chamber connectable to a pressure fluid source on actuation of said brake slip control apparatus, said pressure fluid source having a pressure exceeding a maximum attainable brake pressure by actuation of said master cylinder, and said master cylinder valve opening during actuation of said slip control apparatus to limit and maintain the maximum attainable pressure in said working chamber to a level which is less than the pressure of said pressure fluid source upon actuation of said brake slip control apparatus, wherein the pressure fluid source includes a pump having drive means controllable by the brake slip control apparatus, wherein a non-return valve is interposed between an outlet of the pump and the working chamber of the brake master cylinder, wherein the pressure in the working chamber and at the outlet of the pressure fluid source pump is monitored by a differential pressure alarm switch which disconnects the brake slip control apparatus when a predetermined pressure difference is exceeded.

* * * * *